June 25, 1946. H. W. LEVERENZ 2,402,758
DEVICE FOR AND METHOD OF EXTINGUISHING PHOSPHORESCENCE
Filed Oct. 30, 1941
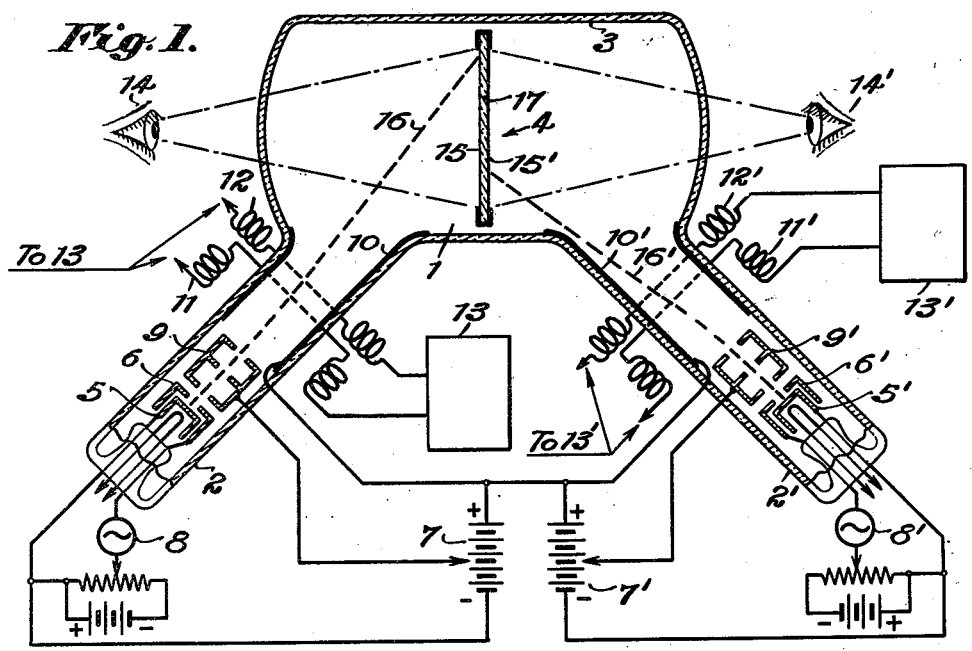
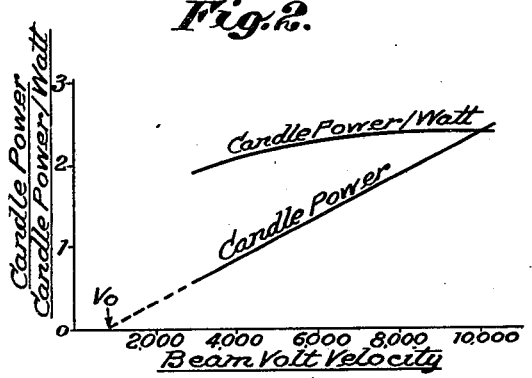
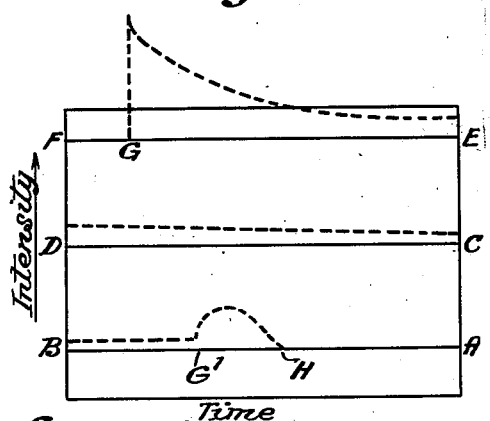
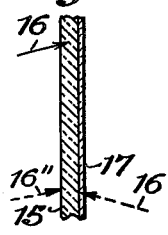
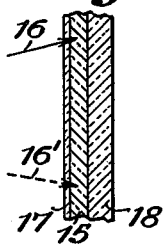
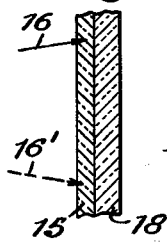
INVENTOR
*Humboldt W. Leverenz*
BY
*Charles McClair*
ATTORNEY Patented June 25, 1946

2,402,758

UNITED STATES PATENT OFFICE 2,402,758

DEVICE FOR AND METHOD OF EXTINGUISH-ING PHOSPHORESCENCE

Humboldt W. Leverenz, South Orange, N. J., assignor to Radio Corporation of America, a corporation of Delaware Application October 30, 1941, Serial No. 417,069

8 Claims. (Cl. 250—150)

My invention relates to luminescent apparatus and particularly to tubes and systems incorporating a luminescent or phosphor screen having long phosphorescence.

Many luminescent materials or phosphors, particularly of the inorganic type, exhibit phosphorescence following excitation to fluorescence by the absorption of radiation from some other source. I use the term "fluorescence" for the light developed during such excitation, and "phosphorescence" for the light liberated by a phosphor subsequent to or following the cessation of such excitation. I use "luminescence" to include both fluorescence and phosphorescence. The phosphorescence exhibited after cessation of excitation to fluorescence of many inorganic luminescent materials is often a considerable, and in some cases, a greater percentage of the fluorescence. In applications such as in aircraft direction and position indicating apparatus, phosphorescence of a phosphor screen may be so used that the course of an approaching aircraft may be developed on the screen as a luminous trace which lasts for an appreciable period of time. For such applications a phosphor which exhibits fluorescence followed by too long a period of phosphorescence has the definite disadvantage that even after an appreciable period of time the contrast between the phosphorescence and the fluorescence is so slight as to at least partially mask the fluorescence and cause confusion. For good results the period of phosphorescence should be limited to a definite time interval which can be varied at will to meet changing conditions, whereby any desired portion of the phosphorescence may be utilized, and then reduced or substantially extinguished within a predetermined period of time following cessation of excitation of the phosphor to luminescence.

It is an object of my invention to provide an improved device having a screen of fluorescent phosphorescing materials, and methods of operation wherein the phosphorescence may be intensified, controlled, minimized or extinguished in definite time sequence variable at will with respect to the cessation of excitation of the screen material to luminescence. It is another object to provide an improved cathode ray tube having such a screen and wherein the trailing or masking by phosphorescence of the fluorescence produced on the screen by the cathode ray beam is avoided without diminution of the fluorescence. It is another object to provide such a tube wherein the duration of effective phosphorescence may be efficiently and easily limited at will to a predetermined length of time. It is also an object to provide means for extinguishing phosphorescence, both with respect to space and time, over localized areas of a phosphorescing material. A further object is to provide methods and means for extinguishing phosphorescence exhibited by a single - layer fluorescent and phosphorescent screen after a predetermined length of time following excitation of the screen to luminescence.

In accordance with my invention I provide a method of developing, over an extended area of a phosphor screen and in a predetermined scanning sequence, luminescence having fluorescent and phosphorescent components incorporating the steps of developing corpuscular energy of insufficient energy level to materially excite further luminescence and using the developed corpuscular energy to extinguish the phosphorescence during a predetermined time interval following the cessation of excitation of the material to fluorescence. Further in accordance with my invention I provide suitable apparatus for practicing my method incorporating a phosphorescing luminescent screen scanned by beams of energy separated in time sequence, one of the beams being a beam of corpuscular energy of such a low energy level that the said screen is not appreciably excited to luminescence.

These and other objects, features and advantages of my invention will become apparent when considered in view of the following description of various modifications of my apparatus and method of operation when taken in connection with the accompanying drawing wherein:

Figure 1 shows a type of tube and apparatus made and operated in accordance with my invention and particularly suited for practicing my method;

Figure 2 shows candle power output and efficiency curves of a representative phosphor with variation in exciting energy level;

Figure 3 shows the enclosed outline of a target area scanned by an electron beam together with a curve illustrating my invention, and Figures 4, 5 and 6 show phosphor screen structures and modes of operation in accordance with further teachings of my invention.

My method of operation is not limited to the particular embodiments set forth hereinafter, but may be practiced with other types of apparatus and, in fact, may be performed by hand, as hereinafter described. One particular apparatus suitable for practicing my invention is shown in Figure 1. The tube I comprises an evacuated envelope having two neck portions 2 and 2' and an intermediate cylindrical portion 3 enclosing a phosphor screen 4 described hereinafter in considerable detail as to its preferred components and methods of construction. The phosphor screen 4 is positioned that it may be scanned by an electron beam on each side thereof, such as developed by electron gun structures located within the neck portions 2 and 2'. The electron guns may be substantially identical and include cathodes 5—5' each surrounded by a control grid or intensity modulating electrodes 6—6' and connected by a lead and potentiometer arrangement to the usual biasing battery, and to the negative terminal of the potential sources 7—7'. Each of the control electrode leads may be provided in series with a source of modulating potentials 8—8', although for certain applications it is necessary to apply modulating potentials to only one of the grid electrodes, such as the grid electrode 6. For other applications, such as for oscillographic measurements, the modulating sources may be omitted. The electrons liberated by the cathodes 5—5' and controlled by the electrodes 6—6' are directed toward opposite sides of the phosphor screen 4 by first anodes 9—9' connected to intermediate points on the potential sources 7 and 7', and for purposes of beam focusing, by second anodes 10—10' connected to the positive terminals of the potential sources 7 and 7' so that the beam comprising the electrons from each gun is focused on the phosphor screen 4. Conventional mutually perpendicular deflection means, such as the vertical deflection coils 11—11' and horizontal deflection coils 12—12', deflect each of the beams over the extended areas of the screen 4 in such a manner that directly opposite areas on the two sides of the screen are scanned at different times. The deflection coils 11 and 12 are connected to a conventional deflection supply circuit shown at 13. This deflection supply circuit may comprise conventional sawtooth generating circuits or may comprise a time axis supply connected to one set of coils with an unknown wave form applied to the other set of coils. Similarly, the deflecting coils 11'—12' may be connected to a separate conventional source of deflection supply or circuit shown at 13' which may likewise develop sawtooth current forms under control of the deflection supply 13 in such a manner that the electron beam from the cathode 5' sweeps over the same areas on the right side of the screen 4 as the areas scanned on the left side and at a predetermined time following the scanning of the left side. Electrostatic means may be substituted in whole or in part for the magnetic means for beam deflection and means may be provided for "keystone correction" which is desirable when the electron beam is swept over an inclined target.

Phosphorescence following cessation of excitation decreases with time, although for certain phosphors the intensity of phosphorescence over an interval of time may be sufficient to mask or at least considerably reduce the contrast of a phosphor screen upon re-excitation to luminescence. The phosphorescence appears to be a result of freeing electrons, of relatively low potential energy value trapped in or near activator centers and in crystal faults of the phosphor, which in returning to activator centers in the phosphor crystal lattice liberate their energy in the form of light. The surfaces of phosphor crystals are logical locations of trapping positions for electrons, since the inherent surface discontinuity of the phosphor crystals induces a faulty crystal structure independent of additional faults induced by mechanical, thermal, chemical or electrical treatment during processing and use of the phosphor.

In accordance with my invention I provide means whereby the electrons in trapping positions in or near the surface of phosphor crystals are displaced or caused to move to trapping positions of lower energy level, whereby the electrons' energies are dissipated, thereby quenching or reducing the phosphorescence at a predetermined time following the excitation of the phosphor to luminescence. Further in accordance with my invention, I utilize cathode rays for the purpose of disturbing the electrons in certain trapping positions of a phosphor, these cathode rays being of sufficiently low velocity to minimize or prevent the re-excitation of the phosphor to fluorescence.

Referring to Figure 2 which shows typical candle power and efficiency curves of a phosphor as a function of incident electron beam velocity, the candle power versus voltage curve as well as the efficiency curve represented as candle power per watt of a representative phosphor decreases with decrease in electron volt velocity to a value $V_0$ electron volts, below which the phosphor is not efficiently excited to luminescence. This value $V_0$ may be referred to as the "dead" voltage of a phosphor, and all phosphors show this particular effect of relative insensibility to luminescence excitation below the value of dead voltage. Therefore more particularly in accordance with my invention, I provide a phosphor material wherein the phosphorescent decay is relatively slow and excite the phosphor to luminescence, followed, after a predetermined period of time, by phosphorescence de-excitation by subjecting the phosphor to a low velocity electron beam having a volt velocity preferably below the dead voltage of the phosphor. Thus referring again to Figure 1, the luminescent screen 4 of a material having relatively high values of phosphorescence following excitation is scanned by a beam of energy such as a high velocity electron beam 16 from the electron gun of which 5 is the cathode. In this manner elemental areas on one side of the phosphor screen 4 are sequentially excited to luminescence. Following the excitation by the beam 16, I sweep the electron beam 16' from the electron gun of which 5' is the cathode over areas of the screen directly opposite the areas previously scanned by the beam 16. The beam 16', however, is of low velocity and preferably at or below the dead voltage of the particular phosphor comprising the screen 4. The potential of source 7' is considerably lower than the potential of source 7 and may be of a sufficiently low value that the beam electrons reach the screen 4 with a volt velocity between 0.1 and 100 volts. Thus in accordance with my method, the phosphor following excitation to luminescence by the beam of energy, whether it be a beam of corpuscular or radiant energy, is subjected to low velocity electrons which do not appreciably excite further luminescence but rapidly dissipate all of their energies upon the surface layers of the phosphor crystals, thereby ejecting trapped electrons which constitute the reservoir for the phosphorescence.

While I have shown a conventional type of electron gun comprising the cathode 5', control electrode 6' and first and second anodes 9'—10' for the development of the low velocity electron beam, more efficient electrode focusing and deflection structures specifically designed for the development of a low velocity beam may be used, such as a structure shown by Iams and Rose in their U. S. Patent 2,213,175.

My invention is particularly useful when utilizing phosphors having relatively long phosphorescent decay characteristics such as zinc sulphides, zinc-cadmium sulphides or sulpho-selenides or combinations of such phosphors. It is also useful with other phosphors having somewhat more rapid decay characteristics such as zinc silicates activated by manganese; with or without arsenic; zinc-beryllium silicates, zinc germanates, zinc-zirconuim silicates, cadmium silicates, zinc or cadmium phosphates, borates or other phosphors having decay characteristics such as to be objectionable as pointed out above. The phosphor material of the screen 4 shown in Figure 1 is preferably exposed to both beams of energy and the screen may comprise a phosphor coated glass or metal fabric or base material permeable to low velocity electrons. The material may be applied to the fabric in any conventional manner such as by spraying, settling or immersing the fabric foundation in a suitable suspension of the phosphor material. Other forms of suitable phosphor screen will be described below.

In operation of my method and system, elemental areas of the phosphor screen are scanned in a predetermined sequence by the electron beam 16 such as, for example, over a scanning raster area as in conventional television, or the beam may be swept over the phosphor screen to develop curve traces of particular wave form. The areas opposite the scanned elemental areas are then scanned at a predetermined time later by the low velocity electron beam 16'. This scanning sequence and the resultant action will be understood by reference to Figure 3 wherein the lines AB, CD and EF represent three elemental lines scanned on opposite sides of the phosphor screen 4 by the two electron beams. It will be assumed that the electron beams are simultaneously scanning widely separated elemental areas at any instant of time for which the instantaneous position of the beam 16 is shown at the point G and the instantaneous position of the electron beam 16' is shown at G'. The dashed line curve originating at the point G is representative of the phosphorescence developed by the phosphor following excitation by the electron beam 16. It will be noted that the ordinates representing intensity of phosphorescence decrease from G to E, from D to C and from B to G', it being assumed that the electron beam 16 has previously scanned the lines AB, CD and E to the point G. The intensity of phosphorescence along these lines is thus shown by the ordinates from the line to the dashed lines and it will be noted that the intensity gradually decreases with time to the point G' but is of finite value at the point G'. The electron beam 16', however, has reached the point G' along the scanning line AB at the time the electron beam 16 has reached the point G. Since the electrons of the electron beam 16' are effective, by dissipation of the energy of these beam electrons, in ejecting trapped electrons which constitute the reservoir for the phosphorescence, the energy stored in the form of these trapped electrons at the point G is quickly dissipated, causing a momentary increase of phosphorescence represented by the ordinates from the point G' to H. It will be noted that the time occupied between the points G' and H is relatively short in comparison with the scanning of a single line such as a line AB. Following the point H the phosphor screen is in darkness and exhibits no appreciable phosphorescence from the point H to A along the scanning line AB and from F to G along the scanning line EF. Thus upon the next subsequent excitation of an elemental area of the screen this elemental area does not have enough phosphorescence to obscure or reduce contrast of the information sought to be portrayed by the subsequent scanning. Obviously, this arrangement allows rapid reduction of phosphorescence without extinction or the positive extinction of the phosphorescence prior to the redevelopment of luminescence by the scanning beam 16. Consequently, the period and intensity of phosphorescence may be controlled over a wide time ranged limited only by the maximum time period between sequential scannings of the same area and a minimum time period necessary for the desired reduction or extinction of the phosphorescence represented by the scanning time between the points G' and H.

The construction of the tube shown in Figure 1 necessitates the use of a phosphor screen which is exposed to a beam of high velocity electrons on one side and a low velocity beam on the opposite side. A tube operating in accordance with my method may also be constructed wherein the screen, while still scanned on opposite sides, may be adequately supported by an electron pervious member, the electron beam velocity being chosen to penetrate this member. Referring to Figure 4 which shows only a portion of the phosphor screen component for use in a tube of the type shown in Figure 1, the phosphor material 15 may be supported by an electron pervious or velocity reducing barrier layer 17 which may be of sufficient thickness to support the phosphor material 15. The layer 17 may be films of glass, enamel or crystal sheets of the elements having an atomic weight less than 100 or their compounds. The screen structure shown in Figure 4 for use in a tube of the type shown in Figure 1 is scanned by a luminescence exciting electron beam 16 which may be of high velocity. However, the opposite side of the screen, that is, the side facing the layer 17 is scanned by an electron beam which originally, before impinging upon the phosphor, is of high velocity, the principal portion of the velocity, however, being absorbed by the layer 17. Thus the layer 17 is chosen of sufficient thickness with respect to the desired beam velocity that substantially the entire velocity of the beam has been absorbed prior to penetrating into contact with the phosphor material 15. The electrons impinging on the phosphor 15 through the layer 17 are thus of sufficiently low velocity, such as at or below the dead voltage value, that inappreciable luminescence occurs due to scanning by the electron beam 16'. However, trapped electrons which constitute the reservoir for the phosphorescence action are ejected, thereby accelerating the phosphorescence as described in connection with Figures 1 and 3. A further advantage of the arrangement shown in Figure 4 resides in the fact that an electron beam of high velocity may be formed and controlled with greater ease than can one of low velocity unless the expedients disclosed in the above-entitled Iams and Rose patent are followed. A still further advantage of this structure and mode of operation results in that a single high voltage power supply may be used replacing the separate sources 7 and 7' shown in Figure 1.

In the modifications of my invention referred to above the phosphor screen structure may be viewed from either side, although it is desirable to view the screen structure from the side subjected to the low velocity electron beam action. However, my invention is also susceptible of use in a tube arrangement wherein the phosphor screen is deposited either directly upon or supported by a nonelectron permeable base, the phosphor screen being scanned from the opposite side of that supported, by both the luminescence producing beam of energy as well as by phosphorescence extinguishing electron beam. Figure 5 shows such a modification wherein an electron permeable layer is provided on the scanned side of the phosphor which is supported from the opposite side by a base member 18 which may be either of transparent material such as glass or opaque reflecting material depending from which side it is desired to view the screen. In this modification the electron beam 16 is of considerably higher velocity for a given produced luminescence than is the beam 16 shown in Figure 4 so that it may penetrate the electron permeable layer 17 while still retaining sufficient energy to excite the phosphor layer 15 to luminescence of the desired intensity. The electron beam 16', however, is of lower velocity but still sufficient to penetrate the layer 17 so that upon penetration the velocity is below the dead voltage value of the particular material comprising the phosphor 15. The layer 17 in the modifications shown in Figures 4 and 5 may be lightly pigmented materials chosen from those cited above wherein the pigment is chosen to be absorptive to the color of phosphorescence so that the effective light output due to phosphorescence may be reduced. Obviously, this expedient is definitely disadvantageous where it is desired to utilize the phosphorescence of the phosphor up to the time of positive extinction by the ejection of trapped electrons from the trapping positions. This modification of my invention shows similar advantages as those shown in Figure 4 with the added feature of an even more rugged support for the phosphor layer 15.

While other modifications of suitable tube structures will at once become apparent to those skilled in the art, I have shown one further modification in Figure 6 wherein the phosphor layer 15 is supported by a base member 18, the opposite side being scanned by a high velocity beam for production of luminescence and by a low velocity beam for extinguishing the phosphorescence component at a predetermined time following its initiation by the original exciting high velocity beam. While this modification is not the preferred construction in view of the difficulty of forming and controlling a high velocity and low velocity electron beam scanned over the same tube volume, it nevertheless may offer certain advantages where rugged support of the phosphor screen is desired without use of an electron permeable barrier layer.

My method of terminating phosphorescence following excitation by a beam of luminescence producing energy is obviously not limited to the use of scanning beams as described. The produced luminescence may be the result of a stationary beam or flow of incident energy of particular shape, formation or density, and similarly, the low velocity electrons may be distributed over the previously excited phosphor by other means than scanning with a beam of electrons. Similarly, my method of operation is not dependent upon the particular apparatus set forth above but may be performed to equal advantage by hand such as developing luminescence in a phosphor by moving an ultra violet light pencil by hand followed by a similar moving of a beam of cathode rays by manipulation of a movable electron source without departing from the scope of my invention.

It will be appreciated that more than a single low velocity electron beam may be used to extinguish the phosphorescence. Referring again to Figure 4, I have shown in addition to the low velocity electron beam 16' a second electron beam 16'' incident upon the opposite side of the screen from and opposite the point of impingement of the beam 16'. Thus where a relatively thick phosphor screen is used it may be desirable to extinguish the phosphorescence from both sides of the screen. Obviously, in view of my above teaching, such a second low velocity beam may be used in conjunction with the electron permeable layer-type screen, the velocity of the beam or beams extinguishing phosphorescence being chosen just sufficient to penetrate the layer.

While in the description of my invention I have disclosed and have also particularly shown in the drawing the use of a high velocity luminescence producing electron beam as representative of a beam of luminescence producing energy, it will be appreciated that beams other than electron beams may be used to produce luminescence. Thus the exciting beam may be of any form of corpuscular energy such as electrons, ions, neutrons or alpha particles, or of radiant energy such as ultra violet light, X-rays or gamma rays. Likewise, the low velocity beam may comprise other forms of corpuscular units such as ions, especially those of high vapor pressure gases such as oxygen, carbon dioxide, hydrogen, helium, nitrogen, fluorine, neon, krypton and xenon. Furthermore, while I have described a single-layer phosphor screen, it will be appreciated that multiple layer screens of the cascade excitation type such as disclosed in my copending application, Serial No. 383,893, filed March 18, 1941, may be used where the advantages ensuing by the use of such cascade screens are desired. Furthermore, while I have disclosed several particular types of tube structures suitable for practicing my method, it will be obvious that other structures may be of equal advantage and I therefore do not wish to be limited to the particular modifications set forth above except as my invention is so limited by the appended claims.

I claim:

1. Apparatus for developing luminescence and suppressing phosphorescence comprising a luminescent screen capable of phosphorescing following excitation to fluorescence, means to form and direct a beam of luminescence producing energy upon said screen, means to line-scan said beam over displaced areas of said screen to excite said areas to luminescence, means to form a beam of corpuscular energy of insufficient velocity to excite said screen to luminescence, and means to line-scan said last-mentioned beam of energy over the displaced areas of said screen following excitation thereof to extinguish phosphorescence over said areas, said last-mentioned beam trailing the first-mentioned beam a constant predetermined time interval.

2. Apparatus for developing luminescent light comprising a tube including a phosphor screen inherently phosphorescent following excitation to luminescence, means to develop a beam of luminescence producing energy, means to line-scan said beam over said screen to excite fluorescence and phosphorescence, means to develop a beam of electrons of insufficient velocity to excite said screen to appreciable luminescence and means to line-scan said last-mentioned beam of electrons over the areas of said screen excited by said beam of luminescence producing energy a constant time after excitation thereof to fluorescence and during the time said screen is excited to phosphorescence.

3. Apparatus for developing luminescence and suppressing excessive phosphorescence comprising a luminescent screen which, following excitation to luminescence, phosphoresces for a relatively long period of time, means to line-scan a beam of luminescence producing energy over areas of said screen, means to develop a beam of electrons of insufficient velocity to excite said screen to luminescence and means to line-scan said beam over the said areas a constant time after said first-mentioned line-scanning within the period of phosphorescence of said screen.

4. A cathode ray tube having two sources of electrons, means adjacent each source to develop one electron beam of high velocity and another beam of lower velocity, a phosphor screen exposed to each of the beams from said sources, said screen having the property of fluorescing under the impact of only the electrons comprising said high velocity beam and continuing to phosoresce following impact, means to line-scan said high velocity beam over progressively displaced areas of said screen to excite said areas to luminescence and means to line-scan the other beam over the areas excited to luminescence following line-scanning of said high velocity beam, and within the period of said screen continues to phosphoresce after the line-scanning of said high velocity beam, said last-mentioned beam trailing the first-mentioned beam a constant predetermined time interval.

5. A cathode ray tube as claimed in claim 4 wherein said sources and said means adjacent each source are exposed to opposite sides of said screen.

6. Apparatus for developing luminescence comprising a tube including a phosphorescent fluorescent screen, an electron permeable layer of electron velocity absorbing material on said screen, means to excite progressively displaced areas of said screen to fluorescence and phosphorescence, means to develop an electron beam of sufficient velocity to penetrate said layer but of insufficient velocity to excite said screen to luminescence following penetration, and means to sweep said beam over said progressively displaced areas after excitation thereof to fluorescence and during the liberation of phosphorescence from said screen.

7. Apparatus for developing luminescence and suppressing excessive phosphorescence comprising a screen of phosphor material inherently capable of phosphorescing following excitation to luminescence, a layer of electron permeable electron energy absorbing material on said screen, means to develop and project a high velocity electron beam upon and through said layer of absorbing material with sufficient velocity to excite said screen to luminescence, means to develop and project a lower velocity electron beam upon and through said layer of absorbing material with insufficient velocity to excite substantial luminescence in said screen and means to sweep each of said beams over progressively displaced areas of said screen over different time periods whereby excessive phosphorescent excitation produced by sweeping the higher velocity beam is terminated in a period of time shorter than the normal phosphorescent decay period of said phosphor material.

8. Apparatus for developing luminescent light comprising a phosphor screen inherently phosphorescent following excitation to luminescence, an electron permeable electron energy absorbing layer of material on one side of said screen, means to develop and trace said screen with a beam of energy to excite said screen to luminescence, means exposed to said layer to develop a beam of electrons of sufficient velocity to penetrate said layer and of a volt velocity between 0.1 and 100 volts following penetration of said layer, and means to trace said electron beam over the same portions of said screen as traced by said beam of energy but at a predetermined time following the tracing of said beam of energy to accelerate the liberation of phosphorescence, whereby said phosphorescence is ineffective in masking luminescence during successsive tracings of said beam of energy.

HUMBOLDT W. LEVERENZ.